(12) United States Patent
Vitunic et al.

(10) Patent No.: US 10,790,747 B1
(45) Date of Patent: Sep. 29, 2020

(54) INDUCTOR CURRENT SHUNT FOR MITIGATION OF LOAD DUMP TRANSIENTS IN DC-DC REGULATORS

(71) Applicant: Analog Devices International Unlimited Company, Limerick (IE)

(72) Inventors: Mark Robert Vitunic, Lexington, MA (US); Eko Lisuwandi, Andover, MA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/594,527

(22) Filed: Oct. 7, 2019

(51) Int. Cl.
*H02M 3/158* (2006.01)
*H02M 1/088* (2006.01)

(52) U.S. Cl.
CPC ........... *H02M 3/158* (2013.01); *H02M 1/088* (2013.01)

(58) Field of Classification Search
CPC .............................. H02M 3/158; H02M 1/088
See application file for complete search history.

(56) References Cited

U.S. PATENT DOCUMENTS

| | | | |
|---|---|---|---|
| 5,889,392 A | 3/1999 | Moore et al. | |
| 6,188,209 B1 | 2/2001 | Poon et al. | |
| 6,229,289 B1 | 5/2001 | Piovaccari et al. | |
| 6,377,034 B1 | 4/2002 | Ivanov | |
| 6,707,281 B2 | 3/2004 | Solivan | |
| 7,327,127 B2 | 2/2008 | Ho | |
| 7,495,419 B1* | 2/2009 | Ju | G05F 1/62 323/225 |
| 7,679,350 B2 | 3/2010 | Falvey et al. | |
| 7,948,720 B2 | 5/2011 | Mok et al. | |
| 8,686,698 B2 | 4/2014 | Lopata et al. | |
| 8,963,526 B2 | 2/2015 | Chen | |
| 9,099,919 B2 | 8/2015 | Jing et al. | |
| 9,871,447 B2 | 1/2018 | Jung et al. | |
| 2012/0032658 A1 | 2/2012 | Casey et al. | |
| 2014/0266090 A1* | 9/2014 | Wei | H02M 3/156 323/271 |

(Continued)

FOREIGN PATENT DOCUMENTS

DE 102014100160 A1 7/2014
EP 2621068 B1 8/2018

OTHER PUBLICATIONS

Poon, N K, et al., "A low cost DC-DC stepping inductance voltage regulator with fast transient loading response", 16th Annual IEEE Applied Power Electronics Conference and Exposition (APEC), vol. 1., (2001), 5 pgs.

(Continued)

*Primary Examiner* — Emily P Pham
(74) *Attorney, Agent, or Firm* — Schwegman Lundberg & Woessner, P.A.

(57) ABSTRACT

A voltage regulator circuit comprises a switching circuit configured to adjust a switching duty cycle to regulate an output voltage at an output node of the voltage regulator circuit using an error signal representative of a difference between a target voltage value and the output voltage; an inductor coupled to the switching circuit and configured to provide an inductor current to the output node; and a shunt circuit coupled in parallel to the inductor and configured to divert the inductor current away from the output node when the output voltage exceeds a specified maximum output voltage.

20 Claims, 8 Drawing Sheets

(56) References Cited

U.S. PATENT DOCUMENTS

| 2015/0194882 A1* | 7/2015 | Ihs | H02M 3/156 |
| | | | 323/272 |
| 2016/0126836 A1* | 5/2016 | Schmitz | H02M 3/157 |
| | | | 323/271 |
| 2016/0359413 A1* | 12/2016 | Ihs | H02M 3/157 |
| 2017/0257031 A1 | 9/2017 | Shao et al. | |
| 2019/0207519 A1 | 7/2019 | Chakraborty et al. | |

OTHER PUBLICATIONS

Solis, Carlos J, et al., "0.6-(mu)m CMOS Switched-Inductor Dual-Supply Hysteretic Current-Mode Buck Converter", IEEE Transactions on Power Electronics, 32(3), (2016), 8 pgs.

* cited by examiner

INDUCTOR CURRENT SHUNT FOR MITIGATION OF LOAD DUMP TRANSIENTS IN DC-DC REGULATORS

FIELD OF THE DISCLOSURE

This document relates to regulator circuits and in particular to mitigating output transients in direct current to direct current (DC-DC) regulator circuits.

BACKGROUND

Regulator circuits can be used to generate a regulated output from a circuit input. For example, a buck voltage regulator circuit uses an input voltage to generate a regulated output voltage less than the input voltage, and a boost regulator circuit generates a regulated output voltage greater than the input voltage. Switching is used to charge and discharge an inductor of the circuits to produce a regulated output. In these types of circuits, and in non-inductor-based regulator circuits as well, an output load current transient may result in an undesirable voltage transient on the regulated output voltage.

SUMMARY OF THE DISCLOSURE

This document relates generally to electronic circuits for voltage regulation and more specifically to improvements in mitigating the effects of a load dump transient on regulator circuits.

In some aspects, a voltage regulator circuit includes a switching circuit configured to adjust a switching duty cycle to regulate an output voltage at an output node of the voltage regulator circuit using an error signal representative of a difference between a target voltage value and the output voltage; an inductor coupled to the switching circuit and configured to provide an inductor current to the output node; and a shunt circuit coupled in parallel to the inductor and configured to divert the inductor current away from the output node when the output voltage exceeds a specified maximum output voltage.

In some aspects, a method of operating a voltage converter circuit includes activating and deactivating a switch circuit to charge and discharge an inductor to generate an output voltage and provide an inductor current to an output node of the voltage regulator circuit; adjusting a switching duty cycle of the switch circuit to regulate the output voltage using an error signal representative of a difference between a target voltage value and the output voltage; comparing the output voltage to a specified maximum output voltage; and diverting the inductor current away from the output node when the output voltage exceeds a specified maximum output voltage.

In some aspects, a voltage regulator circuit includes a switching circuit configured to adjust a switching duty cycle to regulate an output voltage at an output node of the voltage regulator circuit using an error signal representative of a difference between a target voltage value and the output voltage; an inductor coupled to the switching circuit and configured to provide an inductor current to the output node; and a shunt circuit loop coupled to the inductor and configured to circulate the inductor current away from the output node when the output voltage exceeds a specified maximum output voltage and restore the inductor current to the output node when the output voltage decreases to a target voltage less than the specified maximum output voltage.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
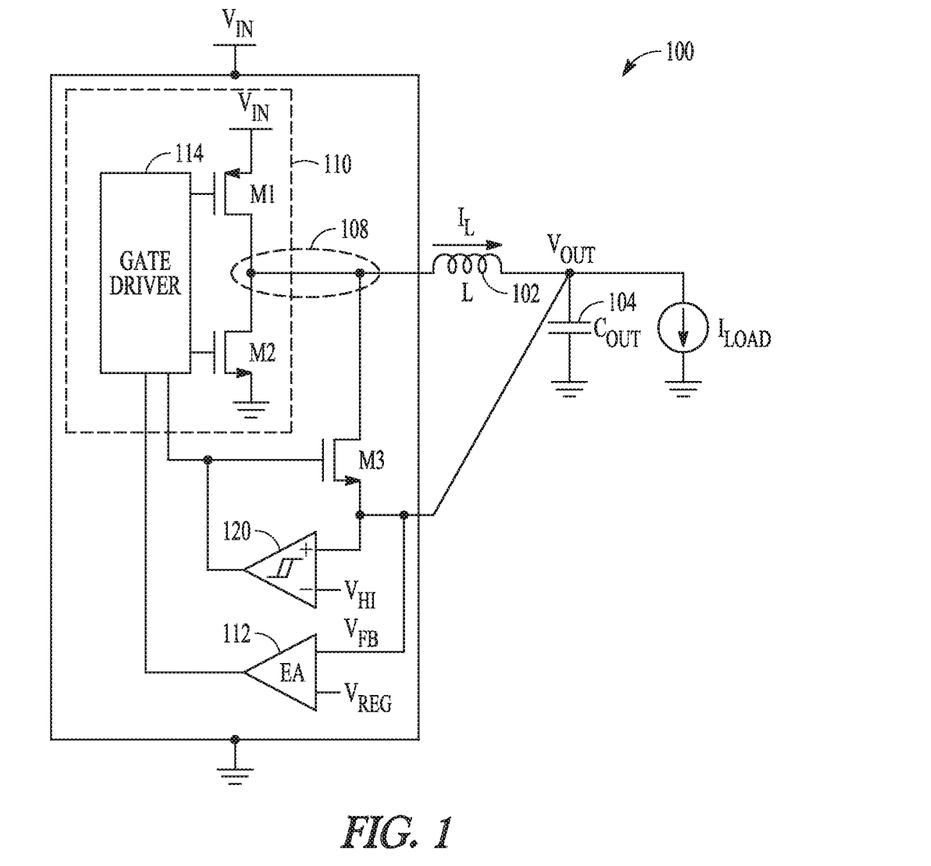
FIG. 1 is a schematic of an example of a voltage regulator circuit.

FIG. 1 is a schematic of an example of a voltage regulator circuit 100. The circuit includes a top-gate transistor M1, a bottom-gate transistor M2, and an inductor 102 (L). In the example, M1 and M2 are field effect transistors (FETs). The voltage regulator circuit 100 can include an output capacitor 104 electrically coupled to an output node and can supply an output voltage $V_{OUT}$ to an output load. The voltage regulator circuit 100 includes a switching circuit 110 having a gate driver 114 and including M1 and M2. The gate driver 114 is configured (e.g., by logic circuitry) to use a clock signal to provide a switching duty cycle that includes a charge portion and a discharge portion. The voltage regulator circuit 100 receives electrical energy during the charge portion of the switching duty cycle.

The inductor 102 can be coupled between the output capacitor 104 and a switching circuit node 108. The bottom-gate transistor M2 can be electrically coupled between the switching circuit node 108 and circuit ground, and the top-gate transistor M1 can be electrically coupled between the switching circuit node 108 and an input node that is electrically coupled to an input voltage $V_{IN}$.

During the charge portions of successive cycles, transistor M1 is turned on or activated to raise the voltage of the switching circuit node 108 almost to the input voltage $V_{IN}$. This initial activation drives a gradually increasing current through the inductor 102 and to the output capacitor 104 and load. During the discharge portion of the switching duty cycles, M2 is turned on to pull the switching circuit node 108 almost to circuit ground. This second activation provides a gradually declining current from the energy stored in the inductor 102 to the output capacitor 104 and load.

The duration of the charge portion of the switching duty cycle can be automatically adjusted to maintain the output voltage $V_{OUT}$ at a specified level. The adjustment can be accomplished using a circuit feedback loop that includes an error amplifier circuit 112. The error amplifier circuit 112 generates an error signal representative of a difference between a target voltage value and the voltage $V_{OUT}$ at the output node of the voltage regulator circuit 100. The output voltage can be scaled (e.g., using a resistive divider) to provide a scaled representation of the output voltage to the error amplifier circuit 112 instead of the actual output voltage as a feedback voltage. The error amplifier circuit 112 compares the feedback voltage ($V_{FB}$) with a voltage reference ($V_{REG}$) to generate the error signal. $V_{REG}$ can be the desired regulated output voltage or a scaled voltage derived from the desired regulated output voltage.

The switching circuit 110 can include logic circuits to implement pulse width modulation (PWM) switching control. The switching circuit 110 sets the durations of the charge portion and discharge portion of the switching duty cycle according to the output voltage. For example, the switching circuit 110 may turn on the top-gate transistor M1 for a duration based on the comparison of the error signal and a reference waveform signal and then activate the bottom gate transistor M2 for the remainder of each period of the clock signal.

Activation of the M1 transistor generates a gradually increasing current in the inductor and activation of the M2 transistor generates a gradually decreasing current in the inductor during each switching duty cycle. The increasing and then decreasing current maintains the feedback voltage at a value substantially equal to the reference voltage $V_{REF}$. This activation sequence maintains the output voltage $V_{OUT}$ at the output port at the desired level regardless of the current demand at the load.

In the example shown in FIG. 1, the circuit topology and the target voltage value generate a regulated voltage for $V_{OUT}$ that is less than the voltage at the input $V_{IN}$ of the voltage regulator circuit (e.g., a buck regulator circuit). Other examples can include, among other things, voltage regulator circuit topologies to generate a regulated $V_{OUT}$ that is greater than $V_{IN}$ (e.g., a boost regulator circuit), and circuit topologies to generate a regulated $V_{OUT}$ that can be either less than or greater than $V_{IN}$ (e.g., a buck-boost regulator circuit).

An output load transient in the negative direction (e.g., a load dump in which the load is removed and the load current $I_{LOAD}$ is reduced to zero) of a DC-DC voltage regulator typically results in a positive voltage transient on the regulated output voltage $V_{OUT}$. This is due to a) finite response time of the voltage regulator to correct the amount of current delivered to the load and b) the combined near-instantaneous effects of electrical series resistance (ESR) and electrical series inductance (ESL) in the output capacitor. This problem is exacerbated for inductor-based DC-DC regulators where the inductor current $I_L$ cannot change instantly, and inductor current typically continues to be delivered to the output capacitor for additional cycles until the current can be reduced to zero. This continued delivery of inductor current to the reduced load causes the regulated output voltage to increase further, which risks violating output voltage specifications; especially if the application requires tight control of the output voltage. This positive voltage transient may cause a system shutdown due to tripping an overvoltage monitoring circuit, or worse, may damage circuits connected to the output node due to overvoltage stress.

Figure 2:
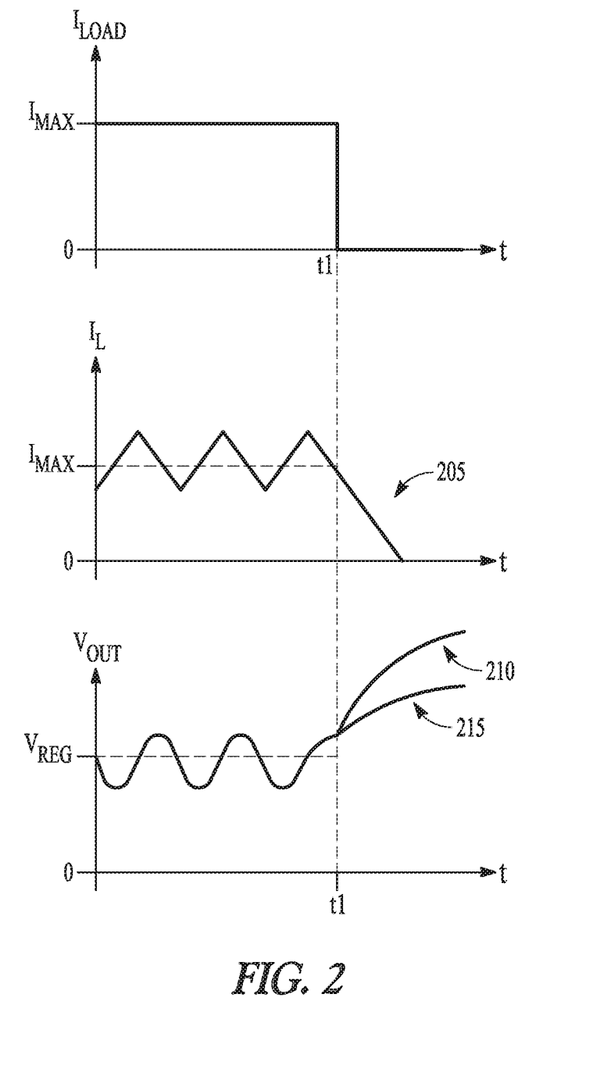
FIG. 2 illustrates current and voltage waveforms for a conventional regulator circuit subjected to a load dump.

FIG. 2 illustrates current and voltage waveforms for a conventional buck regulator circuit subjected to a load dump (e.g., $I_{LOAD}$ decreasing from value $I_{MAX}$ to zero at time $t_1$ as shown in the top graph). Just prior to the load dump event, the inductor current waveform, $I_L$, in the middle graph exhibits normal ripple at the DC-DC switching frequency, and the output voltage, $V_{OUT}$, exhibits a corresponding voltage ripple at the same frequency because $C_{OUT}$ is subject to the AC component of $I_L$ (because $I_{COUT}=I_L-I_{LOAD}$). After $t_1$, all inductor current 205 (including the DC component, $I_{MAX}$) is delivered to the output capacitor until the inductor current 205 can be brought down to zero. This is true regardless of whether the buck regulator control scheme turns M1 and M2 both off, or simply turns on M2. As shown in FIG. 2 in the bottom graph, the output voltage response to this extra current is a voltage overshoot 210. The amount of overshoot depends on the value of $C_{OUT}$ and higher $C_{OUT}$ values leads to reduced voltage overshoot 215. However, there is an increased cost in bill of materials (BOM) and board space associated with increasing the output capacitance. Additionally, because inductor current continues to be delivered to the output node, increasing the capacitance of $C_{OUT}$ does not eliminate the additional overshoot, it only lessens it.

To eliminate or limit the voltage overshoot, the inductor current can be diverted away from the output capacitor $C_{OUT}$ and the output node $V_{OUT}$. This causes the inductor current to be brought down to zero with no further increase in the output voltage.

Figure 3:
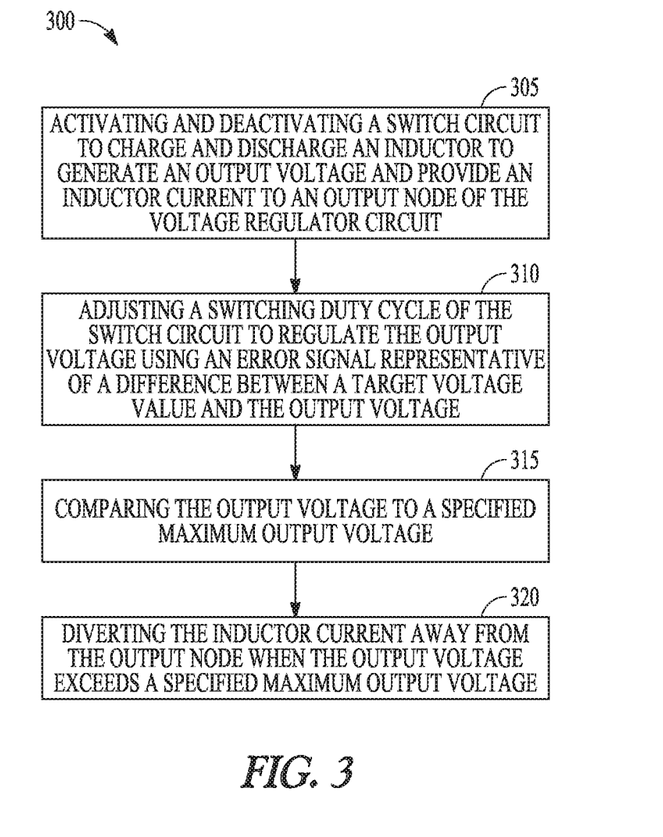
FIG. 3 is a flow diagram of a method of operating a voltage regulator circuit.

FIG. 3 is a flow diagram of a method of operating a voltage regulator circuit, such as the voltage regulator circuit of FIG. 1. At 305, a switch circuit is activated and deactivated to charge and discharge an inductor to generate an output voltage and provide an inductor current to an output node of the voltage regulator circuit. At 310, a switching duty cycle of the switch circuit is adjusted to regulate the output voltage using an error signal representative of a difference between a target voltage value and the output voltage. In certain examples PWM is used to regulate the output voltage.

At 315, the output voltage is compared to a specified maximum output voltage. The specified maximum voltage may be greater than the desired regulated voltage. At 320, the inductor current is diverted away from the output node when the output voltage exceeds the specified maximum output voltage.

Returning to FIG. 1, to divert the inductor current, the voltage regulator circuit includes a shunt circuit that diverts the inductor current away from the output node and the output capacitor when the output voltage exceeds a specified maximum output voltage. The shunt circuit includes transistor M3 connected in parallel to the inductor L. Transistor M3 functions as a shunt switch controlled by a hysteretic comparator 120. The output of comparator 120 is active or high when the output voltage rises to a specified maximum output voltage value ($V_{HI}$). Because of its hysteresis, the output of comparator 120 does not return to inactive or low until the output voltage falls to a value lower than $V_{HI}$ (e.g., the desired regulated voltage level $V_{REG}$).

Figure 4:
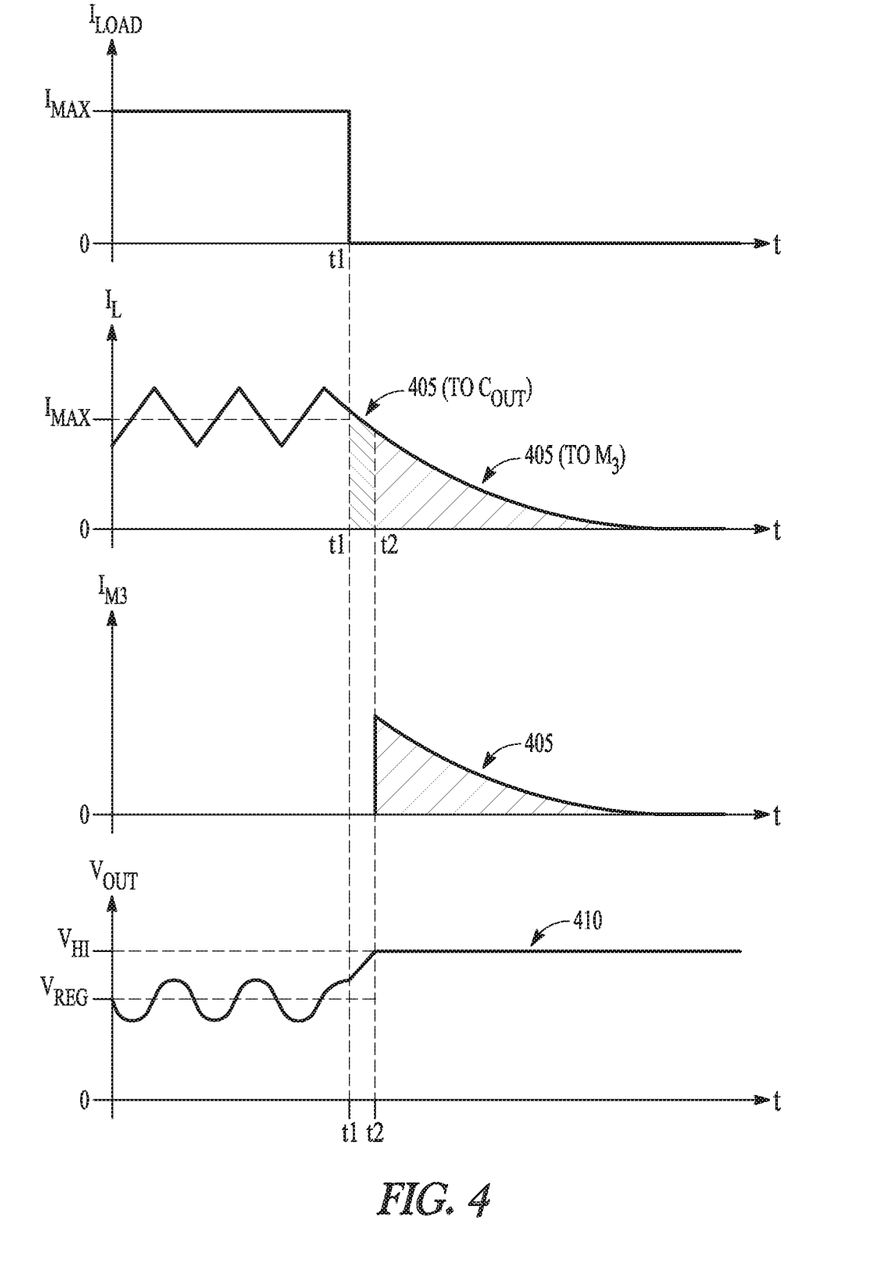
FIG. 4 illustrates current and voltage waveforms for the voltage regulator circuit of FIG. 1.

FIG. 4 illustrates current and voltage waveforms for the voltage regulator circuit of FIG. 1. The top graph in FIG. 4 shows the voltage regulator circuit subjected to the same load dump transient occurring at time $t_1$ as in FIG. 2. In FIG. 4, the waveforms for $I_L$ and $V_{OUT}$ prior to $t_1$ are also the same as in FIG. 2. Immediately after $t_1$, all inductor current 405 (including the DC component, $I_{MAX}$) is initially delivered to the output capacitor causing $V_{OUT}$ to initially rise. However, when $V_{OUT}$ rises to $V_{HI}$ (shown in the bottom graph of FIG. 4 at time $t_2$), comparator 120 trips and turns on transistor M3. As shown in the waveform for $I_{M3}$, the inductor current 405 is then diverted away from the output capacitor and instead circulates in M3, which operates as the "load dump shunt." While M3 is on, the main control loop transistors M1 and M2 are both off. With M3 on, the inductor current can be brought down to zero with no further increase in the output voltage 410.

Because the circulating inductor current is not going to the output capacitor $C_{OUT}$, it does not have to get to zero "fast." The speed with which the circulating inductor current decays to zero depends on the sizing of transistor M3. A smaller M3 (i.e., a higher on resistance $R_{DS(ON)}$) speeds up the decay to zero and is less costly in terms of silicon die area, but M3 shouldn't be sized be too small because it must dissipate the energy E stored in the inductor ($E=\frac{1}{2}LI_{MAX}^2$). Additionally, if the drop across M3 exceeds $V_{OUT}$ plus a diode drop, then the body diode of M2 will turn on, limiting the voltage drop across M3 and potentially putting $C_{OUT}$ back in the current loop. Decay follows an exponential curve due to the changing current times resistance (IR) drop in M3. An example of a good performance compromise between cost and energy dissipation is to size M3 to be in the neighborhood of 5-10% of the size of M2. The low hysteresis voltage level of comparator 120 should be set so that if the output voltage subsequently falls to near the target voltage value $V_{REG}$ (due to leakage or to a new load turning on), M3 is turned off and normal control loop operation resumes.

Figure 5:
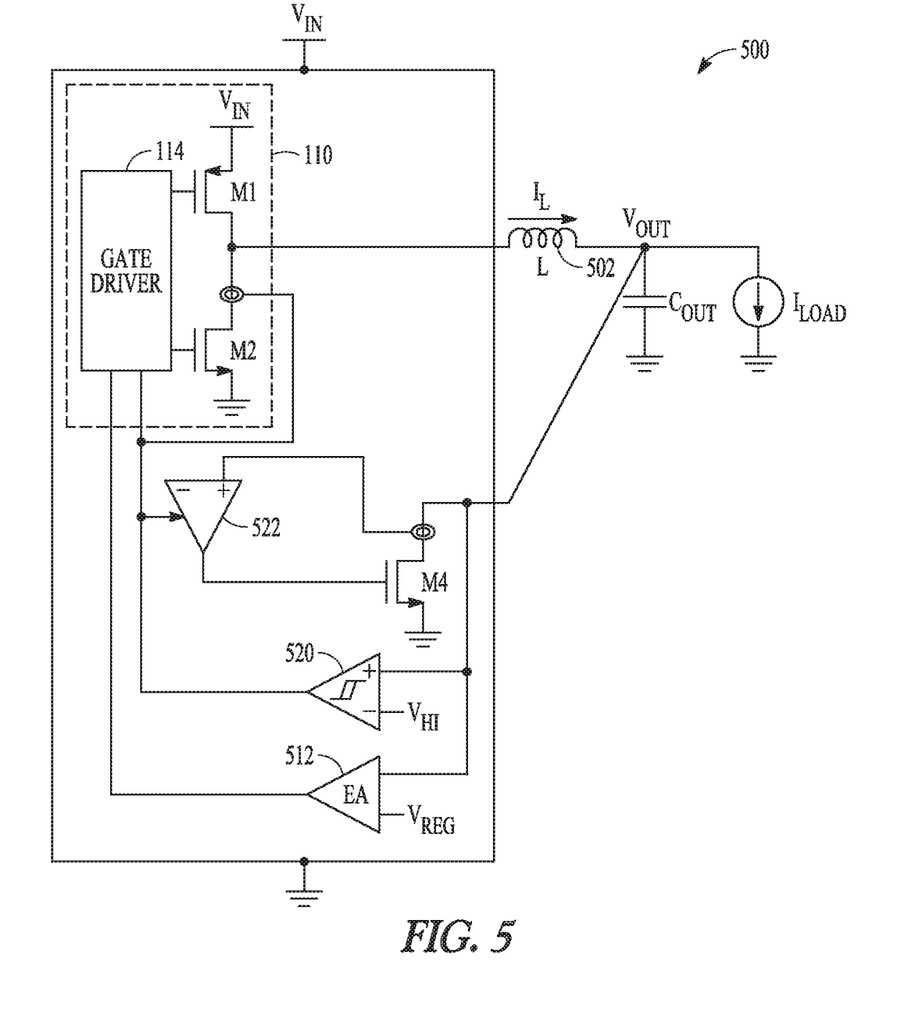
FIG. 5 is a schematic of another example of a voltage regulator circuit.

FIG. 5 is a schematic of another example of a voltage regulator circuit 500. The circuit is a buck regulator circuit as in FIG. 1 and includes inductor 502, top-switch transistor (M1), bottom-switch transistor (M2), a comparator 520 with hysteresis, and error amplifier 512 as in FIG. 1. The difference from FIG. 1 is that the shunt circuit includes a current match amplifier 522 and a transistor M4 connected from $V_{OUT}$ to ground as a shunt switch. The inputs of the current match amplifier 522 are connected to the bottom-switch transistor M2 and the shunt switch transistor M4. The output of the current match amplifier 522 is coupled to the control gate of M4 and the current amplifier includes an enable input connected to the output of comparator 520.

Figure 6:
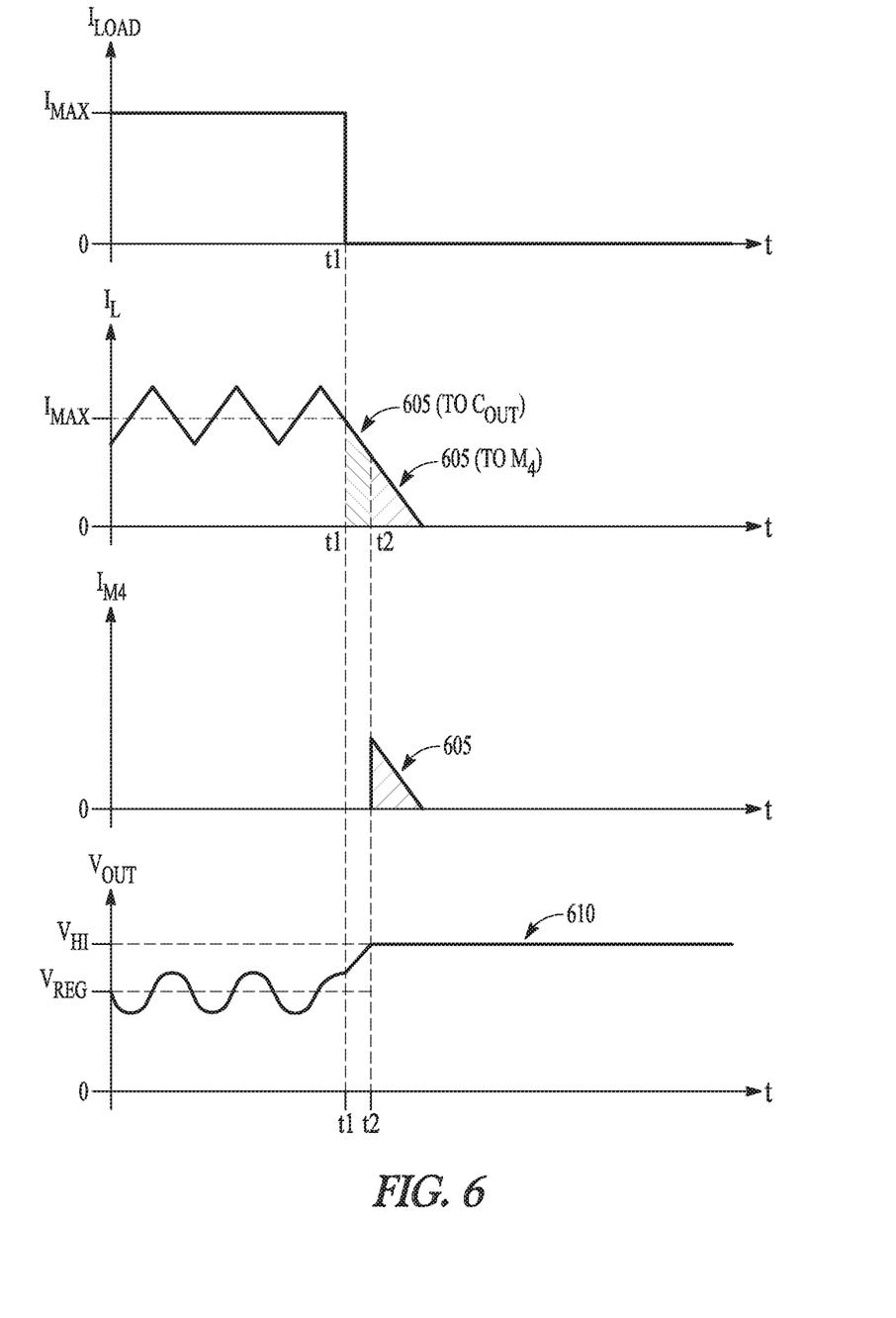
FIG. 6 illustrates current and voltage waveforms for the voltage regulator circuit of FIG. 5.

FIG. 6 illustrates current and voltage waveforms for the voltage regulator circuit of FIG. 5. The functioning is the same as that of the circuit of FIG. 1 up until time $t_2$. In the top graph, the voltage regulator circuit is subjected to the same load dump transient occurring at time $t_1$ as in FIG. 4, and prior to the load dump transient the inductor current waveform, $I_L$, in FIG. 6 exhibits normal ripple at the DC-DC switching frequency. After time $t_1$, all inductor current 605 (including the DC component, $I_{MAX}$) is initially delivered to the output capacitor $C_{OUT}$. At time $t_2$, comparator 520 trips (e.g., the output goes high) when $V_{OUT}$ rises to $V_{HI}$.

At this point, top-switch transistor M1 is turned off and shunt switch transistor M4 is turned on, and the current match amplifier 522 is enabled by the output of the comparator 520. The current match amplifier 522 controls M4 to generate a positive drain current in M4 to match the negative drain current of M2. In FIG. 6, the waveform for $I_{M4}$ shows the inductor current flowing through M4. To the extent that these drain currents of M2 and M4 "match," the resultant portion of the inductor current delivered to the output cap $C_{OUT}$ is zero, and the output voltage 610 will not increase further than $V_{HI}$ as shown in the bottom graph of FIG. 6. Transistor M4 can be sized the same or proportional to M2 (e.g., size(M4)=size(M2/k), where k is a positive integer). As in the example of FIG. 1, the inductor current circulating in M2 and M4 is not going to the output capacitor $C_{OUT}$ and does not have to get to zero fast. The shunt switch connection is removed when $V_{OUT}$ decreases to less than the low hysteresis voltage level of comparator 520 and the circuit returns to normal operation.

The circuits in the examples of FIGS. 1 and 5 are buck voltage regulator circuits. The approaches of the examples in mitigating load dump transients at the circuit output can be used in other types of regulator circuits.

Figure 7:
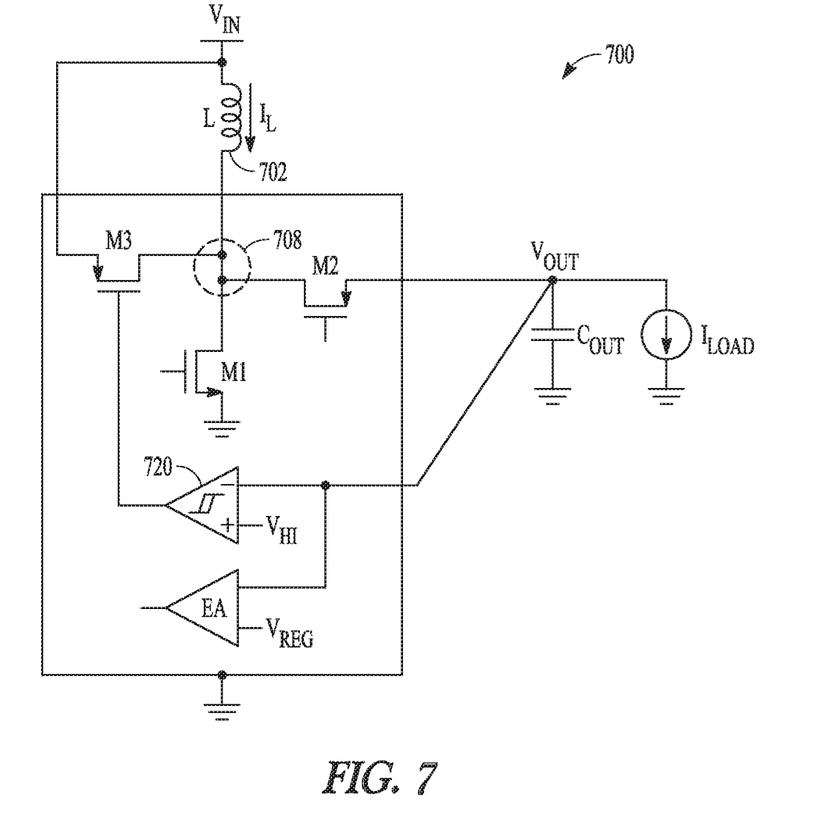
FIG. 7 is a schematic of an example of a boost voltage regulator circuit.

FIG. 7 is a schematic of an example of a boost voltage regulator circuit 700. In the example, the inductor 702 is coupled to an input node $V_{IN}$ of the voltage regulator circuit and a switching circuit node 708. The switching circuit includes a first switch transistor M1 coupled to the switching circuit node 708 and the circuit ground node, and a second switch transistor M2 coupled to the output node and the switching circuit node. The gate driver for the switching circuit is not shown. The shunt switch transistor M3 is coupled in parallel to the inductor 702 and is coupled to the switching circuit node 708 and the input node $V_{IN}$. When the output voltage $V_{OUT}$ exceeds the trip voltage of hysteretic comparator 720, shunt switch transistor M3 turns on to circulate the inductor current and divert the inductor current away from the output capacitor $C_{OUT}$ and the output node to limit the transient of the output voltage.

Figure 8:
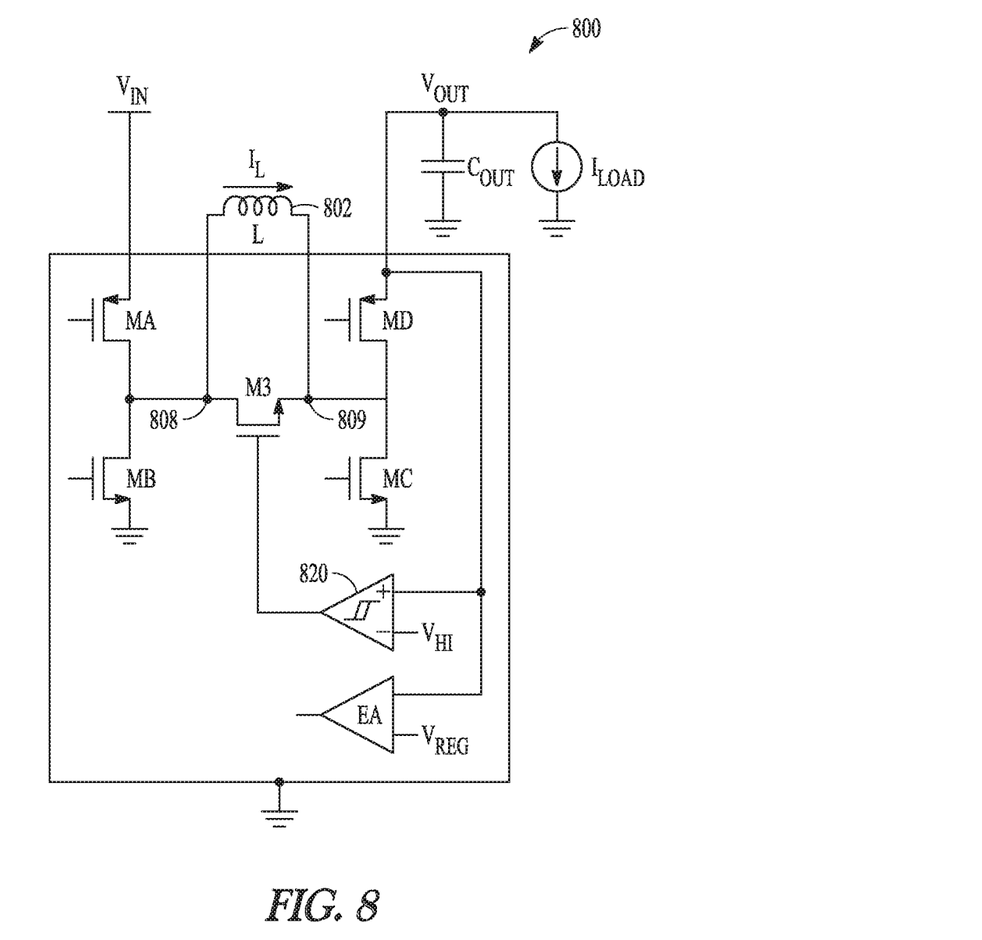
FIG. 8 is a schematic of an example of a buck-boost voltage regulator circuit.

FIG. 8 is a schematic of an example of a buck-boost voltage regulator circuit 800. In the example, the inductor 802 is coupled to a first switching circuit node 808 and a second switching circuit node 809. The switching circuit includes a first switch transistor MA coupled to an input node $V_{IN}$ and the first switching circuit node 808, and a second switch transistor MB coupled to the first switching circuit node 808 and a circuit ground node. The switching circuit further includes a third switch transistor MC coupled to the second switching circuit node 809 and the circuit ground node, and a fourth switch circuit MD coupled to the second switching circuit node 809 and the output node $V_{OUT}$. The shunt switch transistor M3 is coupled to the first switching circuit node 808 and the second switching circuit node 809. As in the other examples, when the output voltage $V_{OUT}$ exceeds the trip voltage of hysteretic comparator 820, the shunt switch transistor M3 turns on to circulate the inductor current $I_L$. This diverts the inductor current away from the output capacitor and the output node to limit the output voltage in the event of a load dump transient.

The method, circuits, and systems described herein provide for DC-DC regulator circuits diverting inductor current away from the output capacitor in an accurate and safe way to limit the output voltage transient and avoid a system shutdown or damage to the circuits.

ADDITIONAL DESCRIPTION AND ASPECTS

Aspect 1 can include subject matter, such as a voltage regulator circuit, comprising a switching circuit configured to adjust a switching duty cycle to regulate an output voltage at an output node of the voltage regulator circuit using an error signal representative of a difference between a target voltage value and the output voltage; an inductor coupled to the switching circuit and configured to provide an inductor current to the output node; and a shunt circuit coupled in parallel to the inductor and configured to divert the inductor current away from the output node when the output voltage exceeds a specified maximum output voltage.

In Aspect 2, the subject matter of Aspect 1 optionally includes an output capacitor coupled to the output node, and a comparator circuit coupled to the output node and configured to compare the output voltage to the specified maximum output voltage and enable the shunt circuit to divert the inductor current away from the output capacitor when the output voltage exceeds the specified maximum output voltage.

In Aspect 3, the subject matter of Aspect 2 optionally includes a comparator circuit coupled to the output node. The shunt circuit includes a shunt switch coupled in parallel to the inductor; and the shunt switch includes a control gate coupled to an output of the comparator circuit. The comparator is optionally configured to compare the output voltage to the specified maximum output voltage and a target voltage less than the specified maximum output voltage, enable the shunt switch when the output voltage exceeds the specified maximum output voltage, and disable the shunt switch after enabling the shunt switch when the output voltage decreases to the target voltage.

In Aspect 4, the subject matter of Aspect 3 optionally includes the inductor is coupled to the output node, and the switching circuit includes: a top switch circuit coupled to a switching circuit node and an input node of the voltage regulator circuit; and a bottom switch circuit coupled to the switching circuit node and a circuit ground node. The shunt switch is coupled in parallel to the inductor and coupled to the switching circuit node and the output node.

In Aspect 5, the subject matter of Aspect 3 optionally includes the inductor coupled to an input node of the voltage regulator circuit. The switching circuit includes: a first switch circuit coupled to a switching circuit node and a circuit ground node; and a second switch circuit coupled to the output node and the switching circuit node. The shunt circuit is coupled in parallel to the inductor and coupled to the switching circuit node and the input node.

In Aspect 6, the subject matter of Aspect 3 optionally includes a switching circuit that includes a first switch circuit coupled to an input node of the voltage regulator circuit and a first switching circuit node, a second switch circuit coupled to the first switching circuit node and a circuit ground node, a third switch circuit coupled to a second switching circuit node and the circuit ground node, and a fourth switch circuit coupled to the second switching circuit node and the output node. The inductor and the shunt switch are coupled to the first switching circuit node and the second switching circuit node.

In Aspect 7, the subject matter of Aspect 1 optionally includes an output capacitor coupled to the output node, and a comparator circuit coupled to the output node. The switching circuit includes a top switch circuit coupled to a switching circuit node and an input node of the voltage regulator circuit, and a bottom switch circuit coupled to the switching circuit node and a circuit ground node. The shunt circuit includes a shunt switch coupled to the output node and circuit ground, and a current match amplifier including inputs coupled to the bottom switch circuit and the shunt switch, an output coupled to a control gate of the shunt switch, and an enable input. The comparator circuit is configured to compare the output voltage to the specified maximum output voltage and provide an enable signal to the current match amplifier to divert the inductor current away from the output capacitor.

Aspect 8 includes subject matter (such as a method of operating voltage regulator circuit), or can optionally be combined with one or any combination of Aspects 1-7 to include such subject matter, comprising activating and deactivating a switch circuit to charge and discharge an inductor to generate an output voltage and provide an inductor current to an output node of the voltage regulator circuit, adjusting a switching duty cycle of the switch circuit to regulate the output voltage using an error signal representative of a difference between a target voltage value and the output voltage, comparing the output voltage to a specified maximum output voltage, and diverting the inductor current away from the output node when the output voltage exceeds a specified maximum output voltage.

In Aspect 9, the subject matter of Aspect 8 optionally includes charging an output capacitor to generate the output voltage, and diverting the inductor current away from the output capacitor when the output voltage exceeds the specified maximum output voltage.

In Aspect 10, the subject matter of Aspect 9 optionally includes enabling a circuit shunt connection to divert the current away from the output capacitor when the output voltage exceeds the specified maximum output voltage, and disabling the circuit shunt connection when the output voltage decreases to a target voltage less than the specified maximum output voltage.

In Aspect 11, the subject matter of one or any combination of Aspects 8-10 optionally includes pulse width modulation of the switch circuit to charge the inductor to generate an output voltage less than an input voltage to the voltage regulator circuit.

In Aspect 12, the subject matter of one or any combination of Aspects 8-10 optionally includes pulse width modulation of the switch circuit to charge the inductor to generate an output voltage greater than an input voltage to the voltage regulator circuit.

In Aspect 13, the subject matter of one or any combination of Aspects 8-10 optionally includes creating a matching current to match the inductor current and diverting the matching current away from an output capacitor at the output node.

In Aspect 14, the subject matter of Aspect 13 optionally includes pulse width modulation of the switch circuit to charge the inductor to generate an output voltage less than an input voltage to the voltage regulator circuit.

Aspect 15 includes subject matter (such as a voltage regulator circuit) or can optionally be combined with one or any combination of Aspects 1-14 to include such subject matter, comprising a switching circuit configured to adjust a switching duty cycle to regulate an output voltage at an output node of the voltage regulator circuit using an error signal representative of a difference between a target voltage value and the output voltage; an inductor coupled to the switching circuit and configured to provide an inductor current to the output node; and a shunt circuit loop coupled to the inductor and configured to circulate the inductor current away from the output node when the output voltage exceeds a specified maximum output voltage and restore the inductor current to the output node when the output voltage decreases to a target voltage less than the specified maximum output voltage.

In Aspect 16, the subject matter of Aspect 15 optionally includes an output capacitor coupled to the output node, and a comparator circuit coupled to the output node and configured to compare the output voltage to the specified maximum output voltage and enable the shunt circuit loop to divert the inductor current away from the output capacitor when the output voltage exceeds the specified maximum output voltage.

In Aspect 17, the subject matter of one or both of Aspects 15 and 16 optionally includes the inductor coupled to the output node, a switching circuit including a top switch circuit coupled to a switching circuit node and an input node of the voltage regulator circuit; and a bottom switch circuit coupled to the switching circuit node and a circuit ground node; and a shunt circuit loop that includes a shunt switch coupled in parallel to the inductor and coupled to the switching circuit node and the output node.

In Aspect 18, the subject matter of one or both of Aspects 15 and 16 optionally includes the inductor coupled to an input node of the voltage regulator circuit; a switching circuit including a first switch circuit coupled to a switching circuit node and a circuit ground node; and a second switch circuit coupled to the output node and the switching circuit node; and a shunt circuit loop including a shunt switch coupled in parallel to the inductor and coupled to the switching circuit node and the input node.

In Aspect 19, the subject matter of one or both of Aspects 15 and 16 optionally includes a switching circuit including a first switch circuit coupled to an input node of the voltage regulator circuit and a first switching circuit node, a second switch circuit coupled to the first switching circuit node and a circuit ground node, a third switch circuit coupled to a second switching circuit node and the circuit ground node, and a fourth switch circuit coupled to the second switching circuit node and the output node. The inductor is coupled to the first switching circuit node and the second switching circuit node, and the shunt circuit loop includes a shunt switch coupled in parallel to the inductor to the first switching circuit node and the second switching circuit node.

In Aspect 20, the subject matter of Aspect 15 optionally includes an output capacitor coupled to the output node, and a switching circuit including a top switch circuit coupled to a switching circuit node and an input node of the voltage regulator circuit, and a bottom switch circuit coupled to the switching circuit node and a circuit ground node. The shunt circuit loop includes the bottom switch circuit and a shunt switch coupled to the output node and circuit ground. The subject further optionally includes a current match amplifier including inputs coupled to the bottom switch circuit and the shunt switch, an output coupled to a control gate of the shunt switch, and an enable input, and a comparator circuit coupled to the output node, wherein the comparator circuit is configured to compare the output voltage to the specified maximum output voltage and provide an enable signal to the current match amplifier to circulate the inductor current in the shunt circuit loop and away from the output capacitor.

These non-limiting Aspects can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A voltage regulator circuit comprising:
   a switching circuit configured to adjust a switching duty cycle to regulate an output voltage at an output node of the voltage regulator circuit using an error signal representative of a difference between a target voltage value and the output voltage;
   an inductor coupled to the switching circuit and configured to provide an inductor current to the output node; and
   a shunt circuit coupled in parallel to the inductor and configured to divert the inductor current away from the output node when the output voltage exceeds a specified maximum output voltage.

2. The voltage regulator circuit of claim 1, including:
   an output capacitor coupled to the output node; and
   a comparator circuit coupled to the output node and configured to compare the output voltage to the specified maximum output voltage and enable the shunt circuit to divert the inductor current away from the output capacitor when the output voltage exceeds the specified maximum output voltage.

3. The voltage regulator circuit of claim 1, including:
   a comparator circuit coupled to the output node;
   wherein the shunt circuit includes a shunt switch coupled in parallel to the inductor; and the shunt switch includes a control gate coupled to an output of the comparator circuit; and
   wherein the comparator is configured to compare the output voltage to the specified maximum output voltage and a target voltage less than the specified maximum output voltage, enable the shunt switch when the output voltage exceeds the specified maximum output voltage, and disable the shunt switch after enabling the shunt switch when the output voltage decreases to the target voltage.

4. The voltage regulator circuit of claim 3,
   wherein the inductor is coupled to the output node;

wherein the switching circuit includes: a top switch circuit coupled to a switching circuit node and an input node of the voltage regulator circuit; and a bottom switch circuit coupled to the switching circuit node and a circuit ground node; and wherein the shunt switch is coupled in parallel to the inductor and coupled to the switching circuit node and the output node.

5. The voltage regulator circuit of claim 3, wherein the inductor is coupled to an input node of the voltage regulator circuit;

wherein the switching circuit includes: a first switch circuit coupled to a switching circuit node and a circuit ground node; and a second switch circuit coupled to the output node and the switching circuit node; and wherein the shunt switch is coupled in parallel to the inductor and coupled to the switching circuit node and the input node.

6. The voltage regulator circuit of claim 3, wherein the switching circuit includes:
- a first switch circuit coupled to an input node of the voltage regulator circuit and a first switching circuit node;
- a second switch circuit coupled to the first switching circuit node and a circuit ground node;
- a third switch circuit coupled to a second switching circuit node and the circuit ground node; and
- a fourth switch circuit coupled to the second switching circuit node and the output node; and wherein the inductor and the shunt switch are coupled to the first switching circuit node and the second switching circuit node.

7. The voltage regulator circuit of claim 1, including:

an output capacitor coupled to the output node;

a comparator circuit coupled to the output node;

wherein the switching circuit includes a top switch circuit coupled to a switching circuit node and an input node of the voltage regulator circuit, and a bottom switch circuit coupled to the switching circuit node and a circuit ground node;

wherein the shunt circuit includes:
- a shunt switch coupled to the output node and circuit ground; and
- a current match amplifier including inputs coupled to the bottom switch circuit and the shunt switch, an output coupled to a control gate of the shunt switch, and an enable input; and wherein the comparator circuit is configured to compare the output voltage to the specified maximum output voltage and provide an enable signal to the current match amplifier to divert the inductor current away from the output capacitor.

8. A method of operating a voltage regulator circuit, the method comprising:

activating and deactivating a switch circuit to charge and discharge an inductor to generate an output voltage and provide an inductor current to an output node of the voltage regulator circuit;

adjusting a switching duty cycle of the switch circuit to regulate the output voltage using an error signal representative of a difference between a target voltage value and the output voltage;

comparing the output voltage to a specified maximum output voltage; and diverting the inductor current away from the output node when the output voltage exceeds a specified maximum output voltage.

9. The method of claim 8, including:

charging an output capacitor to generate the output voltage; and wherein diverting the inductor current includes diverting the inductor current away from the output capacitor when the output voltage exceeds the specified maximum output voltage.

10. The method of claim 9, wherein diverting the inductor current further includes enabling a circuit shunt connection to divert the current away from the output capacitor when the output voltage exceeds the specified maximum output voltage, and disabling the circuit shunt connection when the output voltage decreases to a target voltage less than the specified maximum output voltage.

11. The method of claim 8, wherein activating and deactivating the switch circuit includes pulse width modulation of the switch circuit to charge the inductor to generate an output voltage less than an input voltage to the voltage regulator circuit.

12. The method of claim 8, wherein activating and deactivating the switch circuit includes pulse width modulation of the switch circuit to charge the inductor to generate an output voltage greater than an input voltage to the voltage regulator circuit.

13. The method of claim 8, wherein the diverting the inductor current includes creating a matching current to match the inductor current and diverting the matching current away from an output capacitor at the output node.

14. The method of claim 13, wherein activating and deactivating the switch circuit includes pulse width modulation of the switch circuit to charge the inductor to generate an output voltage less than an input voltage to the voltage regulator circuit.

15. A voltage regulator circuit comprising:

a switching circuit configured to adjust a switching duty cycle to regulate an output voltage at an output node of the voltage regulator circuit using an error signal representative of a difference between a target voltage value and the output voltage;

an inductor coupled to the switching circuit and configured to provide an inductor current to the output node; and a shunt circuit loop coupled to the inductor and configured to circulate the inductor current away from the output node when the output voltage exceeds a specified maximum output voltage and restore the inductor current to the output node when the output voltage decreases to a target voltage less than the specified maximum output voltage.

16. The voltage regulator circuit of claim 15, including:

an output capacitor coupled to the output node; and a comparator circuit coupled to the output node and configured to compare the output voltage to the specified maximum output voltage and enable the shunt circuit loop to divert the inductor current away from the output capacitor when the output voltage exceeds the specified maximum output voltage.

17. The voltage regulator circuit of claim 16, wherein the inductor is coupled to the output node;

wherein the switching circuit includes: a top switch circuit coupled to a switching circuit node and an input node of the voltage regulator circuit, and a bottom switch circuit coupled to the switching circuit node and a circuit ground node; and wherein the shunt circuit loop includes a shunt switch coupled in parallel to the inductor and coupled to the switching circuit node and the output node.

18. The voltage regulator circuit of claim 16,
wherein the inductor is coupled to an input node of the voltage regulator circuit;
wherein the switching circuit includes: a first switch circuit coupled to a switching circuit node and a circuit ground node; and a second switch circuit coupled to the output node and the switching circuit node; and
wherein the shunt circuit loop includes a shunt switch coupled in parallel to the inductor and coupled to the switching circuit node and the input node.

19. The voltage regulator circuit of claim 16,
wherein the switching circuit includes:
  a first switch circuit coupled to an input node of the voltage regulator circuit and a first switching circuit node;
  a second switch circuit coupled to the first switching circuit node and a circuit ground node;
  a third switch circuit coupled to a second switching circuit node and the circuit ground node; and
  a fourth switch circuit coupled to the second switching circuit node and the output node; and
wherein the inductor is coupled to the first switching circuit node and the second switching circuit node, and the shunt circuit loop includes a shunt switch coupled in parallel to the inductor to the first switching circuit node and the second switching circuit node.

20. The voltage regulator circuit of claim 15, including:
an output capacitor coupled to the output node;
wherein the switching circuit includes a top switch circuit coupled to a switching circuit node and an input node of the voltage regulator circuit, and a bottom switch circuit coupled to the switching circuit node and a circuit ground node;
wherein the shunt circuit loop includes the bottom switch circuit and a shunt switch coupled to the output node and circuit ground;
wherein voltage regulator circuit further includes:
a current match amplifier including inputs coupled to the bottom switch circuit and the shunt switch, an output coupled to a control gate of the shunt switch, and an enable input; and
a comparator circuit coupled to the output node, wherein the comparator circuit is configured to compare the output voltage to the specified maximum output voltage and provide an enable signal to the current match amplifier to circulate the inductor current in the shunt circuit loop and away from the output capacitor.

\* \* \* \* \*